(12) United States Patent
Arnold

(10) Patent No.: US 12,466,498 B2
(45) Date of Patent: Nov. 11, 2025

(54) AIR-GUIDING DEVICE FOR A MOTOR VEHICLE, IN PARTICULAR FOR A PASSENGER MOTOR VEHICLE, AND MOTOR VEHICLE

(71) Applicant: Mercedes-Benz Group AG, Stuttgart (DE)

(72) Inventor: Benjamin Arnold, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 399 days.

(21) Appl. No.: 18/256,156

(22) PCT Filed: Nov. 5, 2021

(86) PCT No.: PCT/EP2021/080736
§ 371 (c)(1),
(2) Date: Jun. 6, 2023

(87) PCT Pub. No.: WO2022/122260
PCT Pub. Date: Jun. 16, 2022

(65) Prior Publication Data
US 2024/0034421 A1 Feb. 1, 2024

(30) Foreign Application Priority Data
Dec. 7, 2020 (DE) ...................... 10 2020 007 450.2

(51) Int. Cl.
*B62D 35/02* (2006.01)
*B62D 35/00* (2006.01)
(52) U.S. Cl.
CPC ........... *B62D 35/02* (2013.01); *B62D 35/005* (2013.01)
(58) Field of Classification Search
CPC .............................. B62D 35/005; B62D 35/02
(Continued)

(56) References Cited

U.S. PATENT DOCUMENTS 9,221,503 B2 * 12/2015 Kojima ................. B62D 35/02
11,059,528 B2 * 7/2021 Nakamura ........... B62D 35/005
(Continued)

FOREIGN PATENT DOCUMENTS

DE    10 2009 040 678 A1    4/2010
DE    10 2013 015 886 A1    3/2015
(Continued)

OTHER PUBLICATIONS

PCT/EP2021/080736, International Search Report dated Feb. 14, 2022 (Three (3) pages).

(Continued)

*Primary Examiner* — Jason S Daniels
(74) *Attorney, Agent, or Firm* — Crowell & Moring LLP

(57) ABSTRACT

An air-guiding device for a motor vehicle has a wheel spoiler which is arrangeable in front of a wheel of the motor vehicle in the vehicle longitudinal direction and, when in the installed position, protrudes downwards in the vehicle vertical direction relative to an adjacent underfloor region of the motor vehicle and has, on its downwardly facing side, an air-guiding edge which has a straight, first length region and a non-straight, second length region. The straight, first length region directly adjoins the non-straight, second length region inwardly in the vehicle transverse direction in the installed position, the second length region at least partially covered to the rear in the vehicle longitudinal direction by the wheel in its straight-ahead position when the wheel spoiler is in the installed position. The non-straight, second length region has multiple elevations and depressions following one another alternatingly in the vehicle transverse direction.

6 Claims, 2 Drawing Sheets

(58) Field of Classification Search
USPC .......................................... 296/180.1, 180.2
See application file for complete search history.

(56) References Cited

U.S. PATENT DOCUMENTS

| | | | |
|---|---|---|---|
| 11,077,893 B2* | 8/2021 | Nakata | B62D 35/02 |
| 2015/0225026 A1* | 8/2015 | Ohira | B62D 25/08 |
| | | | 296/180.1 |
| 2015/0274224 A1* | 10/2015 | Ito | B62D 25/18 |
| | | | 296/180.1 |
| 2017/0129552 A1 | 5/2017 | Han et al. | |

FOREIGN PATENT DOCUMENTS

| | | | | |
|---|---|---|---|---|
| DE | 10 2016 006 145 A1 | 11/2016 | | |
| WO | WO-2011048163 A1 * | 4/2011 | ............ | B62D 35/02 |
| WO | WO 2011/126069 A1 | 10/2011 | | |

OTHER PUBLICATIONS

German-language German Office Action issued in German application No. 10 2020 007 450.2 dated Jul. 26, 2021 (Six (6) pages).
Der Spiegel et al., "Warum das Potenzial der Aerodynamik laengst nicht ausgeschoepft wird—Der Spiegel" Mar. 16, 2023, pp. 1-11, German-language, URL: https://spiegel.de/fotostrecke/warum-das-potenzial-der-aerodynamik-laengst-nicht-ausgeschoepft-wird-fotostrecke-93111.html, XP055887719.

* cited by examiner

AIR-GUIDING DEVICE FOR A MOTOR VEHICLE, IN PARTICULAR FOR A PASSENGER MOTOR VEHICLE, AND MOTOR VEHICLE

BACKGROUND AND SUMMARY OF THE INVENTION

The invention relates to an air-guiding device for a motor vehicle, in particular for a passenger motor vehicle. The invention further relates to a motor vehicle, in particular a passenger motor vehicle, having at least one such air-guiding device.

DE 10 2009 040 678 A1 discloses an air-guiding device for a motor vehicle, having a wheel spoiler which can be arranged in the region in front of a corresponding wheel and, when in its installed position, protrudes downwards in the vehicle vertical direction relative to an adjacent underfloor region of the motor vehicle and has, on its downwardly facing side, an air-guiding edge. The air-guiding edge of the wheel spoiler is configured to be non-straight in a length region and has elevations and depressions.

The object of the present invention is to produce an air-guiding device for a motor vehicle and a motor vehicle having such an air-guiding device so that particularly advantageous aerodynamics of the motor vehicle can be achieved.

A first aspect of the invention relates to an air-guiding device for a motor vehicle preferably configured as a passenger motor vehicle. The air-guiding device comprises at least one wheel spoiler which can be arranged in front of a corresponding wheel of the motor vehicle, also referred to as a vehicle wheel, in the vehicle longitudinal direction, and, when in its installed position, protrudes downwards in the vehicle vertical direction relative to an adjacent underfloor region of the motor vehicle. The wheel spoiler assumes its installed position when the motor vehicle is in its fully manufactured state and therefore when the wheel spoiler is held on the motor vehicle or on a component of the motor vehicle. When the wheel spoiler is in the installed position, that is to say when the motor vehicle is in its fully manufactured state, the underfloor region, for example, in the vehicle transverse direction and/or in the vehicle longitudinal direction, abuts against the wheel spoiler which, when in its installed position, protrudes downwards from the underfloor region in the vehicle vertical direction, and so protrudes beyond the underfloor region downwards in the vehicle vertical direction. On its downwardly facing side, also referred to as the underside, in the vehicle vertical direction, the wheel spoiler, when in its installed position, also has an air-guiding edge running in the vehicle transverse direction, also referred to as the bottom edge. Provision is preferably made here for the wheel spoiler, when in its installed position, that is to say downwards in the vehicle vertical direction with respect to its installed position, to end at the air-guiding edge. In particular, provision may be made, when the wheel spoiler is in the installed position, for the air-guiding edge to be or to form the lowest point of the wheel spoiler when viewed downwards in the vehicle vertical direction.

The air-guiding edge has at least one straight, first length region. The feature that the first length region is straight is to be understood as meaning that the air-guiding edge is configured to be at least substantially linear or line-shaped or to run in an at least substantially linear or line-shaped manner in the first length region so that, in the straight, first length region, when the wheel spoiler is in the installed position, the air-guiding edge does not have any elevations and depressions arranged following one another alternatingly in the vehicle transverse direction and extending in the vehicle vertical direction. Furthermore, when the wheel spoiler is in the installed position, the air-guiding edge has a non-straight, second length region directly adjoining the straight, first length region in the vehicle transverse direction. The feature that, when the wheel spoiler is in the installed position, the second length region directly adjoins the first length region in the vehicle transverse direction, is to be understood as meaning that no other, further length region of the air-guiding edge is arranged between the first length region and the second length region in the vehicle transverse direction with respect to the installed position of the wheel spoiler. The feature that the second length region is configured to be non-straight is to be understood as meaning that the non-straight, second length region is configured to be non-linear or non-line-shaped or runs in a non-linear or non-line-shaped manner, and therefore does not extend in an approximately linear or line-shaped manner in the vehicle transverse direction with respect to the installed position of the wheel spoiler.

In order now to be able to achieve particularly advantageous aerodynamics of the motor vehicle, provision is made according to the invention, when the wheel spoiler is in the installed position, for the straight, first length region of the air-guiding edge to directly adjoin the non-straight, second length region inwardly in the vehicle transverse direction. Put the other way, when the wheel spoiler is in the installed position, the non-straight, second length region of the air-guiding edge directly adjoins the straight, first length region outwardly in the vehicle transverse direction. In other words again, when the wheel spoiler is in the installed position, the non-straight, second length region is arranged further out in the vehicle transverse direction than the straight, first length region. Provision is also made according to the invention, when the wheel spoiler is in the installed position, for the non-straight, second length region to be at least partially covered to the rear in the vehicle longitudinal direction by the corresponding wheel in its straight-ahead position. Put the other way, according to the invention, provision is made, when the wheel spoiler is in the installed position, that is to say when the motor vehicle is in its fully manufactured state, for the wheel to be covered to the front in the vehicle longitudinal direction by at least one part of the non-straight, second length region. As a result, for example, when the motor vehicle is travelling forwards, an aerodynamic improvement of a flow around the wheel can be achieved compared to conventional solutions. The flow around the wheel is to be understood as meaning that, when the motor vehicle is travelling forwards, air flows around the wheel, in particular from the front to the rear in the vehicle longitudinal direction. By means of the non-straight, second length region, the flow around the wheel or the air flowing around the wheel is influenced particularly advantageously so that the wheel has air flowing around it in a particularly streamlined manner. Overall, a reduction in the air resistance of the motor vehicle can be achieved by the air-guiding device according to the invention compared to conventional solutions so that the motor vehicle can be operated particularly energy-efficiently, that is to say, for example, particularly efficiently in terms of fuel consumption.

The straight-ahead position of the wheel is to be understood as meaning a position of the wheel through which the motor vehicle can be or is made to travel straight ahead. The wheel may be a steered or steerable wheel and therefore be able to be pivoted about a steering axle running, in particular, at least substantially in the vehicle vertical direction relative to a structure of the motor vehicle configured, for example, as a self-supporting body, in order thereby to bring about travel around bends and/or changes of direction of the motor vehicle, for example during the abovementioned forwards travel of the motor vehicle. The wheel can therefore, for example, be pivoted about the pivot axle into multiple pivot positions differing from one another. One of the pivot positions is the straight-ahead position into which the wheel is pivoted in order to avoid lane changes and changes of direction of the motor vehicle or in order to bring about a or the abovementioned straight-ahead travel of the motor vehicle. In particular, the wheel may be a front wheel. However, it is also conceivable for the wheel to be a rear wheel, in particular in view of rear axle steering. It is furthermore conceivable for the wheel to be a non-steered, that is to say a non-steerable, wheel by means of which changes of direction of the motor vehicle and travel around bends cannot therefore be brought about. The wheel is therefore always in its straight-ahead position. The wheel, also referred to as the vehicle wheel, is an element of the motor vehicle in contact with the ground which, in its fully manufactured state, can be or is supported on a piece of ground via the wheel downwards in the vehicle vertical direction. The wheel, in particular its tyre, directly touches the ground here. If the motor vehicle is driven forwards along the ground, while the motor vehicle is supported on the ground via the wheel downwards in the vehicle vertical direction, then the wheel rolls along the ground or on the ground. The wheel assumes its straight-ahead position here, in particular, when the motor vehicle, in its fully manufactured state, is supported and is standing still on the ground via the wheel downwards in the vehicle vertical direction and, in particular, a steering of the motor vehicle configured to bring about travel around bends and changes of direction of the motor vehicle is established in order to bring about an or the abovementioned straight-ahead travel.

The invention is based, in particular, on the thinking that the air resistance of a motor vehicle plays a major role in terms of mileage and fuel consumption, in particular at higher speeds. The flow of air around wheels makes a significant contribution to the overall air resistance of a vehicle here. Wheel spoilers that are arranged in front of the wheels in the vehicle longitudinal direction, that is to say upstream of the wheels in the direction of flow of the air flowing around the wheels from the front to the rear in the vehicle longitudinal direction, can have a positive influence aerodynamically on the flow around the wheel and lead to a clear reduction in the overall air resistance compared to embodiments in which the vehicles are not equipped with such wheel spoilers. Compared to conventional wheel spoilers, a clear further reduction in the air resistance can be brought about by the invention so that the motor vehicle can be operated particularly efficiently.

In order to be able to achieve a particularly advantageous flow around the wheel and therefore particularly advantageous aerodynamics of the motor vehicle, provision is further made, according to the invention, when the wheel spoiler is in the installed position, for the non-straight, second length region to have multiple elevations and depressions following one another alternatingly in the vehicle transverse direction.

It has proved to be particularly advantageous here for the respective elevation, also referred to as a projection, and/or the respective depression to have, in particular, when the wheel spoiler is in the installed position, a height running at least substantially in the vehicle vertical direction, that is to say at least substantially parallel to the vehicle vertical direction, or obliquely to the vehicle vertical direction, and a width running perpendicularly to the height which, for example, runs at least substantially in the vehicle transverse direction, that is to say at least substantially parallel to the vehicle transverse direction or obliquely to the vehicle transverse direction. In particular, the height runs in a first direction, and the width runs in a second direction running perpendicularly to the first direction, wherein the first direction and the second direction span a first plane which, when the wheel spoiler is in the installed position, for example, runs parallel to a second plane spanned by the vehicle transverse direction and the vehicle vertical direction, or coincides with the second plane. Alternatively or in addition, with respect to the installed position of the wheel spoiler, the vehicle longitudinal direction runs perpendicularly to the first plane spanned by the first direction and the second direction. In relation hereto, it has proved to be particularly advantageous for the ratio of the width as dividend to the height as divisor to lie within a range from 0.5 to 2 inclusive. In other words, the width is designated, for example, by $\lambda$, while the height is designated by 1, so the following preferably applies:

$$0.5 \leq \lambda/1 \leq 2$$

A further embodiment is characterized by the fact that, when the wheel spoiler is in the installed position, a first distance, also referred to as the first ground distance, running in the vehicle vertical direction between the straight, first length region and the ground on which the motor vehicle is standing, therefore on which the motor vehicle is supported via the wheel downwards in the vehicle vertical direction, is greater than a second distance, also referred to as the second ground distance, running in the vehicle vertical direction between the non-straight, second length region and the ground. As a result, the air flowing onto the wheel from the front to the rear in the vehicle longitudinal direction when the motor vehicle is travelling forwards can be influenced particularly advantageously by means of the wheel spoiler so that a particularly good flow around the wheel can be displayed.

In order to be able to establish or influence the flow around the wheel particularly advantageously, provision is made, in a further embodiment of the invention, when the wheel spoiler is in the installed position, for at least a predominant part, that is to say more than half, preferably merely more than a quarter, in particular merely more than a third of a or the length of the non-straight, second length region running in the vehicle transverse direction to be covered to the rear in the vehicle longitudinal direction by the corresponding wheel in its straight-ahead position. Put the other way, provision is preferably made, when the wheel spoiler is in the installed position, for the wheel or at least a part of the wheel to be overlapped or covered to the front in the vehicle longitudinal direction by more than half of the second length region when viewed in the vehicle transverse direction in the vehicle or its length in the vehicle longitudinal direction, allowing particularly advantageous aerodynamics to be achieved. The predominant part of the length of the second length region is also referred to as the first part.

In a further, particularly advantageous embodiment of the invention, provision is made, when the wheel spoiler is in the installed position, for a second part of the length of the non-straight, second length region directly adjoining the first part inwardly in the vehicle transverse direction, to be arranged offset to the wheel in its straight-ahead position inwardly in the vehicle transverse direction. As a result, the flow around the wheel can be influenced particularly advantageously.

In order to be able to achieve particularly advantageous aerodynamics, in a further embodiment of the invention, provision is made for the non-straight, second length region to be configured to be jagged. The elevations are therefore jags which are arranged next to one another in the vehicle transverse direction and thereby form the depressions arranged between each two neighbouring jags, also referred to as recesses, or delimit them outwardly on both sides in the vehicle transverse direction. As a result, the flow around the wheel can be influenced particularly advantageously.

In order to achieve particularly advantageous flow around the wheel, it has proved to be advantageous, when the wheel spoiler is in the installed position, for the straight, first length region to be arranged entirely offset to the wheel in its straight-ahead position inwardly in the vehicle transverse direction. This means that provision is preferably made, when the wheel spoiler is in the installed position, for the wheel not to be covered to the front in the vehicle longitudinal direction by the straight, first length region. It is also conceivable, when the wheel spoiler is in the installed position, for the wheel or a part of the wheel to be covered to the front in the vehicle longitudinal direction by the straight, third length region.

Finally, it has proved to be particularly advantageous, when the wheel spoiler is in the installed position, for a width of the wheel in its straight-ahead position, extending in the vehicle transverse direction, to be covered at least predominantly, that is to say at least by more than half, to the front in the vehicle longitudinal direction, by the non-straight, second length region, as a result of which, when the motor vehicle is travelling forwards, the wheel has air flowing around it in a particularly advantageous manner.

By means of the wheel spoiler and, in particular, by means of the non-straight, second length region here, when the motor vehicle is travelling forwards, turbulence can be introduced into the air flowing around the wheel spoiler and the wheel from the front to the rear in the vehicle longitudinal direction, in particular into its flow. This turbulence supplies energy to a boundary layer flow along a tyre sidewall of the wheel. The more turbulent boundary layer flow, also referred to as the tyre boundary layer flow, is able to overcome an advantageously large rise in pressure and thereby remains adjacent to the wheel for longer. Compared to conventional solutions, this results in an aerodynamically improved flow around the wheel and flow losses as a result of detached flow can be reduced compared to conventional solutions. Overall, this leads to a reduction in the overall air resistance of the motor vehicle compared to conventional solutions. Unlike conventional solutions which aim to stabilize a shear layer lying further inside, the invention achieves a targeted generation of turbulence of the flow of air flowing around the wheel during forwards travel, as a result of which particularly advantageous aerodynamics can be displayed.

A second aspect of the invention relates to a motor vehicle preferably configured as a passenger motor vehicle which has at least one air-guiding device according to the first aspect of the invention. Advantages and advantageous configurations of the first aspect of the invention are to be regarded as advantages and advantageous configurations of the second aspect of the invention and vice versa.

Further advantages and details of the invention are set out in the following description and by reference to the drawings.

DETAILED DESCRIPTION OF THE DRAWINGS

Figure 1:
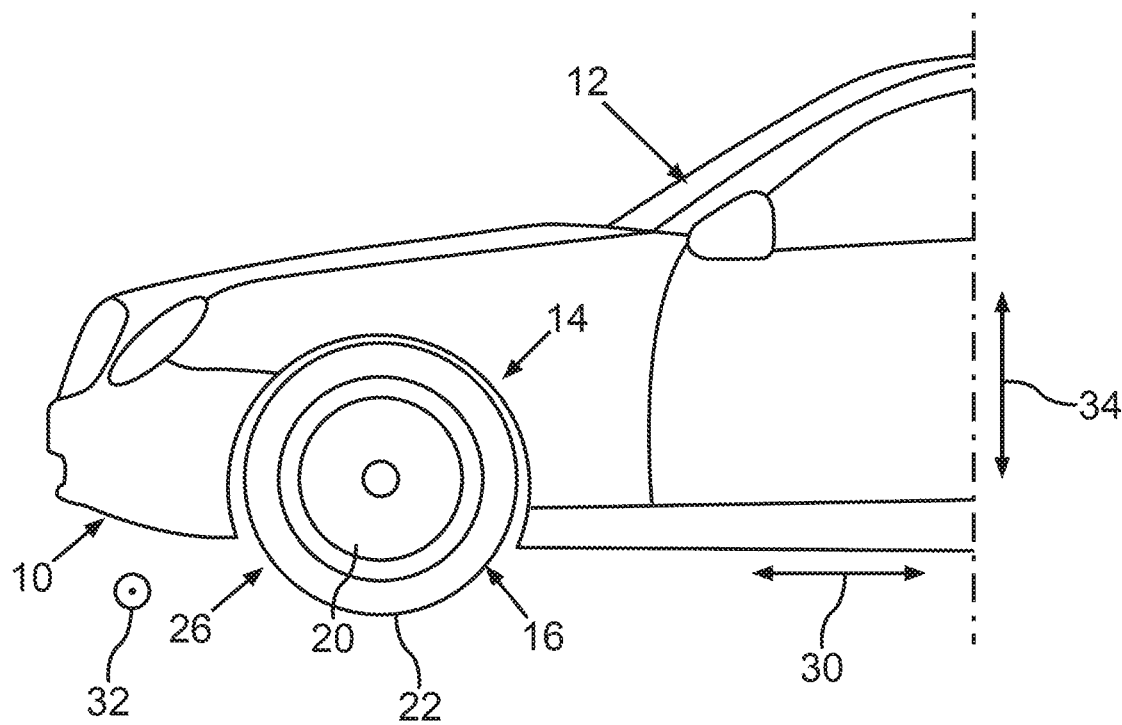
FIG. 1 shows an excerpt of a schematic side view of a motor vehicle configured as a passenger motor vehicle which comprises an air-guiding device with a wheel spoiler which has an air-guiding edge with a straight, first length region and a non-straight, second length region which, when the wheel spoiler is in the installed position, directly adjoins the first length region outwards in the vehicle transverse direction.

In the figures, identical or functionally identical elements are given the same reference numerals.

Figure 2:
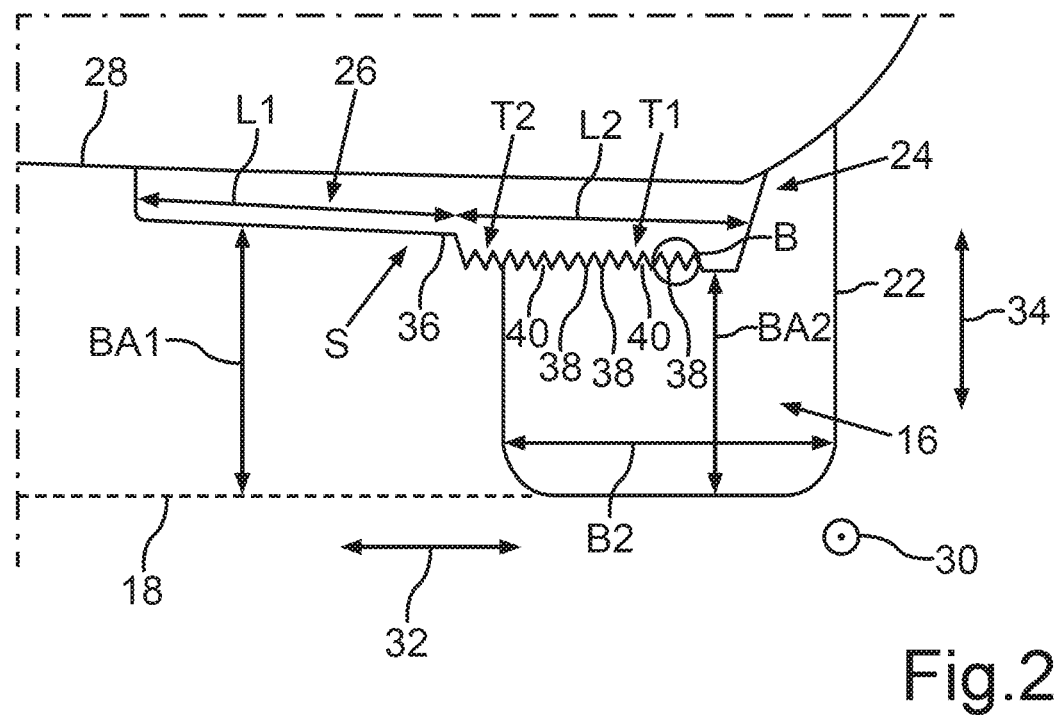
FIG. 2 shows a schematic front view of the air-guiding device.

FIG. 1 shows an excerpt, in a schematic side view, of a motor vehicle configured as a passenger motor vehicle 10, the structure of which configured as a self-supporting body is designated by 12. The structure 12 delimits an interior space of the passenger motor vehicle also referred to as the passenger compartment or passenger space, in the interior space of which occupants, such as, for example, the driver of the passenger motor vehicle 10, can be accommodated when the passenger motor vehicle 10 is being driven. FIG. 1 also shows a wheel arch 14 of the passenger motor vehicle 10. At least partially accommodated in the wheel arch 14 is a wheel 16 of the passenger motor vehicle 10 configured here as a front wheel, in particular as a front left wheel, and also referred to as a vehicle wheel. The wheel 16 is an element in contact with the ground via which the passenger motor vehicle 10—as can be seen when viewed in conjunction with FIG. 2—can be or is supported on a preferably at least substantially horizontal piece of ground 18 downwards in the vehicle vertical direction. The wheel 16 comprises a rim 20 and a tyre 22 mounted onto the rim 20, which directly touches the ground 18. FIGS. 1 and 2 show the passenger motor vehicle 10 when it is at a standstill and is in its fully manufactured state. The steerable wheel 16 is also in its straight-ahead position by means of which the passenger motor vehicle 10 can be or is made to travel straight ahead, in particular when the passenger motor vehicle 10 is driven by means of at least one engine and is thereby driven forwards along the ground 18. During this forwards travel, the wheel 16, in particular the tyre 22, rolls directly on the ground 18.

Figure 3:
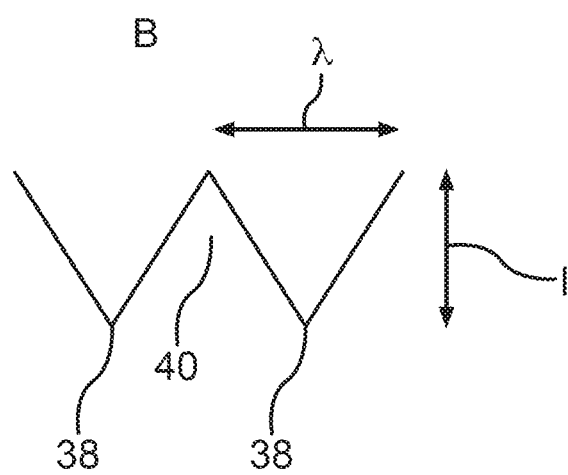
FIG. 3 shows an enlarged representation of a region of the air-guiding device designated by B in FIG. 2.

As can be seen particularly clearly in conjunction with FIGS. 2 and 3, the passenger motor vehicle 10 has an air-guiding device 24 having at least one wheel spoiler 26 which, when the passenger motor vehicle 10 is in the fully manufactured state, is arranged in front of the corresponding wheel 16 in the vehicle longitudinal direction. In its installed position shown in FIGS. 1 to 3, the wheel spoiler 26 protrudes downwards in the vehicle vertical direction with respect to an underfloor region 28 of the passenger motor vehicle 10 adjacent to the wheel spoiler 26, wherein the wheel spoiler 26 assumes its installed position when the passenger motor vehicle 10 is in the fully manufactured state. While the vehicle longitudinal direction is shown by a double arrow 30, the vehicle transverse direction is shown by a double arrow 32 and the vehicle vertical direction by a double arrow 34. The vehicle longitudinal direction is also referred to as the x direction, while the vehicle transverse direction is also referred to as the y direction and the vehicle vertical direction is also referred to as the z direction.

As can be seen particularly clearly from FIG. 2, when the wheel spoiler 26 is in the installed position, the wheel spoiler 26 has, on its side S pointing or facing downwards in the vehicle vertical direction, also referred to as the underside, an air-guiding edge 36. In the exemplary embodiment shown in the figures, the wheel spoiler 26 ends at the air-guiding edge 36, also referred to as the bottom edge, downwards in the vehicle vertical direction. When the wheel spoiler 26 is in the installed position, the air-guiding edge 36 has a straight, first length region L1 and a non-straight, second length region L2 directly adjoining the straight, first length region L1 in the vehicle transverse direction. It can further be seen that the wheel 16 has a width B2 running in the vehicle transverse direction, wherein more than half of the width B2 of the wheel 16 running in the vehicle transverse direction is overlapped or covered to the front in the vehicle longitudinal direction by the wheel spoiler 26.

In order now to be able to achieve a particularly advantageous flow around the wheel and therefore particularly advantageous aerodynamics of the passenger motor vehicle 10, when the wheel spoiler 26 is in the installed position and therefore when the passenger motor vehicle 10 is in the fully manufactured state, the straight, first length region L1 directly adjoins the non-straight, second length region L2 inwardly in the vehicle transverse direction. When the wheel spoiler 26 is in the installed position, the non-straight, second length region L2 is also covered at least partially, in particular at least predominantly and therefore at least by more than half, to the rear in the vehicle longitudinal direction by the corresponding wheel 16 in its straight-ahead position. In the exemplary embodiment shown in the figures, provision is made for at least more than half of the width B of the wheel 16 extending in the vehicle transverse direction to be overlapped or covered to the front in the vehicle longitudinal direction by a non-straight, second length region L2.

A region of the air-guiding device 24, in particular of the wheel spoiler 26, is designated by B in FIG. 2. The region B is shown in enlarged form in FIG. 3. As can be seen particularly clearly from FIGS. 2 and 3, when the wheel spoiler 26 is in the installed position, the non-straight, second length region L2 has multiple elevations 38 and depressions 40 following one another alternatingly in the vehicle transverse direction, wherein the respective depression 40 is delimited outwardly in the vehicle transverse direction on both sides by in each case precisely two elevations 38 neighbouring it in the vehicle transverse direction. In other words, the respective depression 40 is arranged in the vehicle transverse direction between two elevations 38 neighbouring it in the vehicle transverse direction. The elevations 38 taper downwards in the vehicle vertical direction and end at a point so that, conversely, the respective depression 40 narrows upwards in the vehicle vertical direction and likewise tapers at its upper end in the vehicle vertical direction. As a result, the length region L2 is configured to be in jagged or zig-zag form. This enables a particularly advantageous flow around the wheel to be achieved. The flow around the wheel is to be understood as meaning that air flows around the wheel 16 when the passenger motor vehicle 10 is travelling forwards and, in particular, when the passenger motor vehicle 10 is travelling straight ahead. The air flowing around the wheel 16 or the flow thereof can be influenced or established particularly advantageously by means of the wheel spoiler 26 and, in particular, by means of the length region L2 here so that particularly advantageous aerodynamics can be displayed.

It can also be seen from FIG. 3 that the respective elevation 38 and therefore the respective depression 40 has a height 1 and a width λ. The height 1 runs along a first direction, and the width λ runs along a second direction which runs perpendicularly to the first direction. The first direction may run parallel to the vehicle vertical direction or slightly obliquely thereto. Alternatively or in addition, the second direction may run parallel to the vehicle transverse direction or slightly obliquely thereto. The first direction and the second direction span a first plane which runs parallel to a second plane, also designated as the y-z plane, or coincides with the second plane (y-z plane), wherein the second plane is spanned by the vehicle transverse direction (y direction) and the vehicle vertical direction (z direction). The vehicle longitudinal direction (x direction) therefore runs perpendicularly to the first plane and therefore perpendicularly to the first direction and perpendicularly to the second direction. Provision is preferably made here for the ratio of the width λ to the height 1 to lie within a range from 0.5 to 2 inclusive.

It can further be seen that, when the wheel spoiler 26 is in the installed position, a predominant first part of a length of the non-straight, second length region L2 running in the vehicle transverse direction or in the abovementioned first plane is covered to the rear in the vehicle longitudinal direction by the corresponding wheel 16 in its straight-ahead position or vice versa. The predominant first part is designated by T1 in FIG. 2. A second part T2 of the length of the length region L2 directly adjoins the first part T1 of the length of the length region L2 inwardly in vehicle transverse direction, wherein the second part T2 is substantially smaller and, in particular, less than half, in particular less than a third, of the first part T1. It can be seen that the second part T2 is arranged offset to the wheel 16 inwardly in the vehicle transverse direction so that the wheel 16 is not overlapped or covered to the front in the vehicle longitudinal direction by the second part T2. In addition, when the wheel spoiler 26 is in the installed position, the straight, first length region L1, which immediately and therefore directly adjoins the second part T2 inwardly in the vehicle transverse direction, is arranged entirely offset to the wheel 16 in its straight-ahead position inwardly in the vehicle transverse direction so that the wheel 16 in its straight-ahead position is not overlapped or covered to the front in the vehicle longitudinal direction by the length region L1.

In addition, provision is made, in the installed position of the wheel spoiler 26 shown in the figures, for a first ground distance BA1 running in the vehicle vertical direction between the straight, first length region L1 representing a straight bottom edge part and the ground 18 to be greater than a second ground distance BA2 running in the vehicle vertical direction between the non-straight, second length region L2 representing a non-straight bottom edge part and the ground 18. This enables particularly advantageous aerodynamics to be displayed.

The invention claimed is:

1. An air-guiding device (24) for a motor vehicle (10), comprising:
a wheel spoiler (26) which is arrangeable in front of a wheel (16) of the motor vehicle (10) in a vehicle longitudinal direction (30) and, when in an installed position on the motor vehicle (10), protrudes downwards in a vehicle vertical direction (34) relative to an adjacent underfloor region (28) of the motor vehicle (10) and has, on a downwardly facing side(S), an air-guiding edge (36) running in a vehicle transverse direction (32) which has a straight, first length region (L1) and a non-straight, second length region (L2) which directly adjoins the straight, first length region (L1) in the vehicle transverse direction (32) when the wheel spoiler (26) is in the installed position;

wherein the straight, first length region (L1) directly adjoins the non-straight, second length region (L2) inwardly in the vehicle transverse direction (32) when the wheel spoiler (26) is in the installed position, wherein the non-straight, second length region (L2) is at least partially covered to a rear in the vehicle longitudinal direction (30) by the wheel (16) in a straight-ahead position when the wheel spoiler (26) is in the installed position, and wherein the non-straight, second length region (L2) has a plurality of elevations (38) and depressions (40) following one another alternatingly in the vehicle transverse direction (32) when the wheel spoiler (26) is in the installed position;

wherein the non-straight, second length region (L2) is configured as jagged;

wherein when the wheel spoiler (26) is in the installed position, the straight, first length region (L1) is disposed entirely offset to the wheel (16) in its straight-ahead position inwardly in the vehicle transverse direction (32);

wherein when the wheel spoiler (26) is in the installed position, a width (B2) of the wheel (16) in its straight-ahead position extending in the vehicle transverse direction (32) is covered at least predominantly to a front in the vehicle longitudinal direction (30) by the non-straight, second length region (L2).

2. The air-guiding device (24) according to claim 1, wherein an elevation (38) and/or a depression (40) has a height (1) and a width (2) running perpendicularly thereto and wherein a ratio of the width (2) as a dividend to the height (1) as a divisor lies within a range from 0.5 to 2 inclusive.

3. The air-guiding device (24) according to claim 1, wherein, when the wheel spoiler (26) is in the installed position, a first distance (BA1) running in the vehicle vertical direction (34) between the straight, first length region (L1) and a piece of ground (18) on which the motor vehicle (10) is supported via the wheel (16) downwards in the vehicle vertical direction (34) is greater than a second distance (BA2) running in the vehicle vertical direction (34) between the non-straight, second length region (L2) and the ground (18).

4. The air-guiding device (24) according to claim 1, wherein, when the wheel spoiler (26) is in the installed position, at least a predominant part (T1) of a length of the non-straight, second length region (L2) running in the vehicle transverse direction (32) is covered to the rear in the vehicle longitudinal direction (30) by the wheel (16) in its straight-ahead position.

5. The air-guiding device (24) according to claim 4, wherein, when the wheel spoiler (26) is in the installed position, a second part (T2) of the length of the non-straight, second length region (L2) directly adjoining the part (T1) inwardly in the vehicle transverse direction is disposed offset to the wheel (16) in its straight-ahead position inwardly in the vehicle transverse direction.

6. A motor vehicle (10), comprising:
the air-guiding device (24) according to claim 1.

* * * * *